United States Patent
Kim et al.

(10) Patent No.: US 11,370,719 B2
(45) Date of Patent: Jun. 28, 2022

(54) CONTROLLED-RELEASE TYPE FERTILIZER WITH DECREASED FLOATING PROPERTY COMPRISING TRI-BLOCK COPOLYMER AND METHOD FOR PREPARING THE SAME

(71) Applicant: LG CHEM, LTD., Seoul (KR)

(72) Inventors: Mihee Kim, Daejeon (KR); Hyosook Joo, Daejeon (KR); Eun Kyoung Park, Daejeon (KR); Hyeon Choi, Daejeon (KR); Kiyoul Yoon, Daejeon (KR); Joon Seok Lee, Ulsan (KR)

(73) Assignee: LG CHEM, LTD., Seoul (KR)

( * ) Notice: Subject to any disclaimer, the term of this patent is extended or adjusted under 35 U.S.C. 154(b) by 79 days.

(21) Appl. No.: 16/646,959

(22) PCT Filed: Sep. 13, 2018

(86) PCT No.: PCT/KR2018/010752
§ 371 (c)(1),
(2) Date: Mar. 12, 2020

(87) PCT Pub. No.: WO2019/054771
PCT Pub. Date: Mar. 21, 2019

(65) Prior Publication Data
US 2020/0270184 A1    Aug. 27, 2020

(30) Foreign Application Priority Data
Sep. 13, 2017  (KR) .......................... 10-2017-0117392

(51) Int. Cl.
C05G 3/40 (2020.01)
C05G 5/12 (2020.01)
C05G 5/30 (2020.01)

(52) U.S. Cl.
CPC .................. *C05G 3/44* (2020.02); *C05G 5/12* (2020.02); *C05G 5/37* (2020.02)

(58) Field of Classification Search
None
See application file for complete search history.

(56) References Cited

U.S. PATENT DOCUMENTS

| | | | | |
|---|---|---|---|---|
| 4,369,055 A | * | 1/1983 | Fujita .......................... | B01J 2/30 |
| | | | | 71/64.11 |
| 5,147,442 A | * | 9/1992 | Kosuge ..................... | C05G 5/37 |
| | | | | 71/64.07 |
| 6,500,223 B1 | * | 12/2002 | Sakai ........................ | B01J 2/006 |
| | | | | 71/64.07 |
| 6,656,975 B1 | | 12/2003 | Christiano et al. | |
| 7,541,386 B2 | | 6/2009 | Kostka et al. | |
| 2003/0073583 A1 | | 4/2003 | Kostka et al. | |
| 2005/0172858 A1 | * | 8/2005 | Schonherr ............. | A23K 30/15 |
| | | | | 106/287.24 |
| 2006/0089259 A1 | | 4/2006 | Driessen et al. | |
| 2006/0141010 A1 | * | 6/2006 | Karl ........................ | C05G 5/37 |
| | | | | 424/442 |

FOREIGN PATENT DOCUMENTS

| | | |
|---|---|---|
| CN | 105636922 A | 6/2016 |
| CN | 106613280 A | 5/2017 |
| CN | 106631515 A | 5/2017 |
| GB | 1326783 A | 8/1973 |
| JP | S56-120597 A | 9/1981 |
| JP | H10-167868 A | 6/1998 |
| JP | H10-236895 A | 9/1998 |
| JP | H11-092261 A | 4/1999 |
| JP | 2001-031489 A | 2/2001 |
| JP | 2003-081705 A | 3/2003 |
| JP | 2003-165788 A | 6/2003 |
| JP | 2005-041700 A | 2/2005 |
| JP | 2005-324981 A | 11/2005 |
| JP | 2005-536572 A | 12/2005 |
| JP | 2008-518869 A | 6/2008 |
| JP | 2009-242195 A | 10/2009 |
| JP | 2017-081777 A | 5/2017 |
| KR | 10-0932943 B1 | 12/2009 |
| KR | 10-1410859 B1 | 7/2014 |

OTHER PUBLICATIONS

Search Report issued for International Application No. PCT/KR2018/010752 datted Jan. 7, 20219, 4 pages.

* cited by examiner

*Primary Examiner* — Wayne A Langel

(74) *Attorney, Agent, or Firm* — Rothwell, Figg, Ernst & Manbeck, P.C.

(57) ABSTRACT

The present invention relates to a controlled-release type fertilizer with outstandingly decreased floating property, comprising a granular fertilize core; a coating layer (shell) formed on the surface of the granular fertilizer core, and comprising olefin-based resin; and additives attached on the coating layer, and comprising ethylene oxide-propylene oxide-ethylene oxide(EO-PO-EO) or propylene oxide-ethylene oxide-propylene oxide(PO-EO-PO) tri-block copolymer.

15 Claims, No Drawings

CONTROLLED-RELEASE TYPE FERTILIZER WITH DECREASED FLOATING PROPERTY COMPRISING TRI-BLOCK COPOLYMER AND METHOD FOR PREPARING THE SAME

CROSS-REFERENCE TO RELATED APPLICATION

This application is a 35 U.S.C. 371 National Phase Entry Application from PCT/KR2018/010752, filed on Sep. 13, 2018, designating the United States and claims the benefit of Korean Patent Application No. 10-2017-0117392 filed on Sep. 13, 2017 with the Korean Intellectual Property Office, the disclosures of which are herein incorporated by reference in their entirety.

TECHNICAL FIELD

The present invention relates to a controlled-release type fertilizer with decreased floating property, and a method for preparing the same. More specifically, the present invention relates to a controlled-release type fertilizer wherein the floating property of the existing controlled-type fertilizer is decreased by short and simple mixing, and a method for preparing the same.

BACKGROUND ART

With the purpose of laborsaving of fertilization or manifestation of the effect of fertilizer according to the growth and development of plants, various controlled-release type fertilizers have been developed.

Representative controlled-release type fertilizer includes a coated fertilizer of which surface is coated with various resins or inorganic substances, and for example, the coated fertilizer means a fertilizer wherein the velocity of dissolution of fertilizer components is controlled by coating the surface of a common quick acting fertilizer with specific polymer resins such as acryl resin, polyurethane, polyolefin resin, etc. to a certain thickness, and thus, during the whole growth and development period of crops, fertilizer components are slowly released in necessary amount. Since the coated granular fertilizer can last fertilizer efficiency during the whole growth and development period of crops, the number of fertilization is reduced and fertilization labor force is reduced, and the fertilizer use efficiency of crops is increased to the maximum, thus reducing the pollution of river or underground water by fertilizer nutrients, and thus, it is considered as being the best fertilizer among the fertilizers developed so far. However, the coating of such a controlled-release type fertilizer mostly consist of resin lacking hydrophilicity, and thus, a problem of floating of the fertilizer in rain or water during fertilization has been raised.

In order to solve the problem, in the prior art, technologies of preventing floating by attaching additives such as hydrophilic surfactant, anionic surfactant, etc. or inorganic powder such as $SiO_2$, etc. on the fertilizer surface were developed.

However, since a surfactant having high HLB is hydrophilic, there is still a possibility that the fertilizer floats or the surfactant is eluted in water, and inorganic powder may not be sufficiently attached to the fertilizer surface and the powder may take off during the process or when using the fertilizer.

BRIEF SUMMARY OF THE INVENTION

The present invention provides a controlled-release type fertilizer that fulfills release controllability and productivity required in a controlled-release type fertilizer, and simultaneously, has decreased floating property in that a fertilizer hardly floats after fertilization.

One aspect of the present invention relates to a controlled-release type fertilizer comprising a granular fertilizer core; a coating layer(shell) formed on the surface of the granular fertilizer core, and comprising olefin-based resin; and additives attached on the coating layer, and comprising ethylene oxide-propylene oxide-ethylene oxide(EO-PO-EO) or propylene oxide-ethylene oxide-propylene oxide(PO-EO-PO) tri-block copolymer.

Another aspect of the present invention relates to a method for preparing a controlled-release type fertilizer having additives comprising the tri-block copolymer.

DETAILED DESCRIPTION OF THE EMBODIMENTS

Hereinafter, the embodiments of the present invention will be explained in detail.

Specifically, the controlled-release type fertilizer according to the present invention comprises a coating layer comprising olefin-based resin, and an additive attachment layer comprising EO-PO-EO or PO-EO-PO tri-block copolymer, sequentially on the surface of a granular fertilizer core.

In the present invention, the fertilizer may be various known fertilizers, for example, urea or a compound fertilizer.

The olefin-based resin, although not limited hereto, may be polyolefin or copolymer of olefin and ethylene-vinyl acetate. Preferably, the polyolefin may be high density or low density polyethylene, polypropylene, ethylene-propylene copolymer, polybutene, butene-ethylene copolymer, butene-propylene copolymer. In the present invention, the ethylene-vinyl acetate copolymer is copolymer comprising ethylene and vinyl acetate, and the content and molecular weight of the vinyl acetate are not specifically limited.

According to preferable embodiment, the amount of the coating layer comprising olefin-based resin is 1 to 20 wt %, preferably 2 to 15 wt %, based on the total weight of the fertilizer. According to specific embodiment, the olefin-based resin is coated on the granular fertilizer core to form a film(shell), and thus, the fertilizer is included in the film.

In the present invention, on the surface of a fertilizer wherein a granular fertilizer core is included in the film comprising olefin-based resin, additives comprising ethylene oxide-propylene oxide-ethylene oxide(EO-PO-EO) or propylene oxide-ethylene oxide-propylene oxide(PO-EO-PO) tri-block copolymer are further coated.

In the EO-PO-EO or PO-EO-PO tri-block copolymer, PO block corresponding to a hydrophobic group preferably has weight average molecular weight of 950 to 4000, and the HLB value of the tri-block copolymer is preferably 1 to 10. And, it is preferable that EO block is included in the amount of 5 to 50 wt %, based on the total weight of the tri-block copolymer.

In the prior documents, in order to decrease the floating property of granular fertilizers, a method of attaching or mixing hydrophilic surfactant having HLB of 6 to 16 or more on the surface of a fertilizer has been suggested. However, the EO-PO-EO or PO-EO-PO tri-block copolymer, a surfactant used in the present invention, has HLB of 1 to 10, more preferably 1 or more and 5 or less, and the weight average molecular weight of PO block corresponding to a hydrophobic group is preferably 950 to 4,000, more preferably 1500 or more and 4000 or less. It is preferable that the hydrophobic groups are included in the amount of 50 to 95 wt %, based on the total weight of the tri-block copolymer. And, it is preferable that the weight average molecular weight of the hydrophilic group EO block is 50 to 2000, and it is preferable that the hydrophilic groups are included in the amount of 5 to 50 wt %, based on the total weight of the tri-block copolymer. If the length of the hydrophobic group is too short, attachment to the surface of a fertilizer may not be good, and thus, it is not suitable for mixing within a short time, and if the length is too long, affinity with water may be lowered, and thus, the effect of decreasing floating property may be low.

Moreover, it was confirmed that in case the hydrophilic groups are included at the above weight range, the additives are very effectively attached on the surface of a fertilizer even by weak mixing for a short time. And, if the amount of hydrophilic group EO block is greater than 50 wt %, attachment to the hydrophobic fertilizer surface is rather weak, and if it is less than 5 wt %, there is no effect for decreasing floating property. Thus, appropriate balance between attachment force to the hydrophobic fertilizer surface and hydrophilicity for decreasing floating is required. According to one embodiment of the present invention, it was confirmed that unlike previously reported, although HLB value is high, in case the properties of the hydrophobic groups and hydrophilic groups defined in the present invention are not fulfilled, the prevention effect of floating of a granular fertilizer is low.

And, the amount of the EO-PO-EO or PO-EO-PO tri-block copolymer is 0.025 wt % to 0.5 wt %, based on the total weight of the controlled-release type fertilizer. And, if it is less than 0.025 wt %, the amount is not sufficient, and thus, it is difficult to promote hydrophilicity on the fertilizer surface, and if it is introduced in an amount greater than 0.5 wt %, although floating property is decreased, consolidation of a fertilizer may be caused, and since the surfactant itself is relatively expensive, it is not appropriate to introduce beyond necessary.

According to preferable embodiment, in order to more efficiently decrease the floating property of a controlled-release type fertilizer, the coating layer may further comprise inorganic powder. Such inorganic powder may be preferably hydrophilic inorganic powder having hydroxyl groups on the surface, and more preferably, precipitated silica. In the specific examples according to the present invention, Sipernat 22S of Evonik company was used. Preferably, the inorganic powder has a specific surface area of 100 $m^2/g$ to 500 $m^2/g$, and particle size of 1 µm to 500 µm. If the specific surface area of the inorganic powder is less than 100 $m^2/g$, the hydrophilic part exposed on the surface is not sufficient, and thus, affinity with water is low and the floating property decrease effect is lowered, and if it is greater than 500 $m^2/g$, specific gravity is generally low, thus causing process difficulty. If the particle size is less than 1 µm, fine powder is blown, and thus, the processability is lowered, and if the particle size is greater than 100 µm, it is difficult to sufficiently attach on the fertilizer surface. The amount of the inorganic powder is preferably 0.01 wt % to 1 wt %, based on the total weight of the controlled-release type fertilizer. And, if it is less than 0.01 wt %, the amount is not sufficient, and thus, affinity with water is lowered, and floating property decrease effect is low, and if it is greater than 1 wt %, although floating property is decreased, continuous detaching of the inorganic powder that is attached beyond necessary occurs, and thus, process dust is blown, or failure in the fertilization machine may be caused.

According to preferable embodiment, the controlled-release type fertilizer of the present invention comprises liquid additives attached on the surface, comprising the EO-PO-EO or PO-EO-PO tri-block copolymer and/or the inorganic powder. If the additives is liquid, mixability is very good, and thus, may be uniformly attached to the granular fertilizer even by simple mixing, thus outstandingly decreasing floating property.

According to another aspect, the present invention relates to a method for preparing a controlled-release type fertilizer, comprising the steps of:

i) coating the surface of a granular fertilizer core with a coating composition comprising olefin-based resin; and ii) coating the first coating layer with additives comprising ethylene oxide-propylene oxide-ethylene oxide(EO-PO-EO) or propylene oxide-ethylene oxide-propylene oxide (PO-EO-PO) tri-block copolymer.

In the preparation method of the present invention, the steps i) and ii) may be conducted by known coating methods without specific limitations. Preferably, the additives used in step ii) is liquid.

In the present invention, a controlled-release type fertilizer with decreased floating property can be prepared within a short time by a simple mixing method such as ball mill.

Advantageous Effects

The controlled-release type fertilizer according to the present invention outstandingly decreases floating property that becomes a problem in the existing controlled-release type fertilizer, thereby preventing floating on the water surface after fertilization, and remarkably reducing the amount of dust generation.

DETAILED DESCRIPTION OF THE EMBODIMENTS

Hereinafter, the present invention will be explained in detail through Examples and Experimental Examples, but these Examples and Experimental Examples are presented only as the illustration of the present invention, and the scope of the present invention is not limited thereby.

Examples 1 to 13 and Comparative Examples 1 to 4: Preparation of Controlled-Release Type Fertilizer In order to confirm floating properties according to the compositions of controlled-release type fertilizers, controlled-release type fertilizers were prepared using the additives and inorganic powders corresponding to the conditions of the following Table 1.

TABLE 1

| | Additive (EO-PO-EO or PO-EO-PO) | Property of additive | Amount of additive (wt %) | Weight ratio of EO in additive (%) | Weight average molecular weight of hydrophobic group in additive | Additive HLB | Inorganic powder | Specific surface area of inorganic powder (m²/g) | Amount of inorganic powder (wt %) | mixability | Floating rate (%) |
|---|---|---|---|---|---|---|---|---|---|---|---|
| Example 1 | Pluronic L 121 | Liquid | 0.5 | 10 | 4,000 | 2 | — | — | — | ○ | 0 |
| Example 2 | Pluronic L 61 | Liquid | 0.5 | 10 | 1,750 | 3 | — | — | — | ○ | 0 |
| Example 3 | Pluronic L31R1 | Liquid | 0.5 | 5 | 3,124 | 1 | — | — | — | ○ | 0 |
| Example 4 | Pluronic L 31 | Liquid | 0.5 | 10 | 950 | 3 | — | — | — | ○ | 42 |
| Example 5 | Pluronic L 35 | Liquid | 0.5 | 50 | 950 | 10 | — | — | — | ○ | 50 |
| Example 6 | Pluronic L 64 | Liquid | 0.5 | 40 | 1,750 | 8 | — | — | — | ○ | 88 |
| Example 7 | Pluronic L 10R5 | Liquid | 0.5 | 50 | 1,070 | 9 | — | — | — | ○ | 93 |
| Example 8 | Pluronic L 121 | liquid | 0.1 | 10 | 4,000 | 2 | — | — | — | ○ | 2 |
| Example 9 | Pluronic L 61 | Liquid | 0.1 | 10 | 1,750 | 3 | — | — | — | ○ | 2 |
| Example 10 | Pluronic L 31R1 | Liquid | 0.1 | 5 | 3,124 | 1 | — | — | — | ○ | 4 |
| Example 11 | Pluronic L31R1 | Liquid | 0.025 | 5 | 3,124 | 1 | — | — | — | ○ | 15 |
| Example 12 | Pluronic L 121 | Liquid | 0.025 | 10 | 4,000 | 2 | Sipernat 22S | 190 | 0.1 | ○ | 0 |
| Example 13 | Pluronic L 31R1 | Liquid | 0.025 | 5 | 3,124 | 1 | Sipernat 22S | 190 | 0.1 | ○ | 0 |
| Comparative Example 1 | None | | 0 | 0 | 0 | — | — | — | — | — | 100 |
| Comparative Example 2 | Pluronic F 127 | solid | 0.5 | 70 | 4,000 | 14 | — | — | — | x | 100 |
| Comparative Example 3 | Pluronic E 87 Prill | Solid | 0.5 | 70 | 2,332 | 14 | — | — | — | x | 100 |
| Comparative Example 4 | Pluronic F 68 | Solid | 0.5 | 80 | 1,750 | 16 | — | — | — | x | 100 |

Specifically, first, a granular fertilizer coated with olefin-based resin was prepared using a fluidized bed type preparation apparatus. Specifically, hot air was applied at the lower part of the fluidized bed type preparation apparatus to make the fertilizer particles float in the air flow, and then, a coating solution was sprayed through an inlet installed on the side. The above process was conducted until the final coating amount became 10 wt %, and the solvent was condensed and recovered through a condenser. After the spraying of the solution was finished, only hot air was sprayed to dry, thus preparing a granular fertilizer having a coating layer comprising olefin-based resin. 45 g of the granular fertilizer having a particle diameter of about 4 mm, prepared as described above, was filled in a 70 ml vial, and then, the additive (surfactant) described in Table 1 was introduced in the amount of 0.025 to 0.5 wt %, based on the total weight of the fertilizer, and the inorganic powder was introduced in the amount of 0.1 wt %, based on the total weight of the fertilizer. They were mixed for 1 minute on a roller mixer rotating at 60 rpm to prepare a controlled-release type fertilizer.

Experimental Example 1: Examination of the Floating Property of Controlled-Release Type Fertilizer In order to examine the floating properties of the controlled-release type fertilizers prepared according to Examples 1 to 13 and Comparative Examples 1 to 3, the floating rates were measured. Specifically, about 300 coated fertilizers were spread in a 600 ml beaker so as not to overlap, and then, 50 ml of water was slowly introduced along the wall surface of the beaker. The floating rate was calculated as the percentage of the number of particles floated on the water surface after the introduction of water, compared to the total number of particles. If the floating rate is less than 100%, it was judged that there is floating prevention effect, and the calculated floating rates were shown in the Table 1.

Specifically, as the result of confirming the floating properties of Examples 1 to 13 and Comparative Examples 1 to 4, the followings are confirmed.

1) In case the property of the additive is liquid, mixability is very good, and thus, it was uniformly attached to the granular fertilizer only by 60 rpm roller mixing for 1 minute. As the result, when the additive was introduced in the amount of 0.025 wt % to 0.5 wt %, the effect for decreasing the floating property of the fertilizer was exhibited.

2) Examples 1 to 7 are the additives having HLB of 1 or more and 10 or less, wherein the rate of hydrophilic group EO is 5-50 wt %, and the weight average molecular weight of hydrophobic group is 950 or more and 4,000 or less. When the corresponding additive was introduced in the amount of 0.5 wt %, the effect for decreasing the floating property was confirmed.

3) When the amount of the additive is identical (0.5 wt %), in case the rate of EO block is 40 wt % or more, the floating rate was 40% or more (See Table 1 regarding Examples 5 to 7). And, in the case of Examples 2 and 6 and Comparative Example 4 wherein the weight average molecular weight of hydrophobic group is identical and only the rate of EO is different, as the EO rate increases, HLB increases, and the interaction with water acts more than with the surface of the fertilizer coating, and thus, the floating property decrease effect is lowered. Thus, it can be seen that the additives having the rate of hydrophilic group EO of 5-40 wt %, and HLB of 1 or more and 5 or less exhibit more preferable properties of a controlled-release type fertilizer.

4) Example 4 has EO rate of 10%, similarly to Examples 1 and 2, and has low HLB of 3, but the floating property decrease effect was low. It is judged that the weight average molecular weight of the hydrophobic group is relatively small, and thus, the additive is not sufficiently attached to the surface of the granular fertilizer by weak mixing for a short time. Thus, it can be seen that it is most preferable when the weight average molecular weight of the additive is 1,500 or more and 4,000 or less.

5) As seen in Example 11, reduction of the additive amount to 0.025 wt % also results in floating property prevention effect. Thus, it can be seen that it is preferable when the amount of the additive is 0.025 wt % or more and 0.5 wt % or less, based on the weight of the fertilizer.

6) Examples 12 and 13 attach the inorganic powders and surfactants together, and it can be seen that when the amount of the surfactant is 0.025 wt %, in case the inorganic powder is introduced in the amount of 0.1 wt %, floating property is further decreased, compared to using the surfactant alone.

7) In the case of Comparative Example 1 wherein additive is not introduced, the floating rate was 100%.

8) In Comparative Examples 2 to 4 wherein the property of the additive is solid, mixability was not good, and thus, the additive was not uniformly attached to the granular fertilizers by 60 rpm roller mixing for 1 minute. As the result, when the additive was introduced in the amount of 0.5 wt %, the floating rate of the fertilizer was 100%, and thus, the floating property was not decreased at all.

9) Even if the EO rate in the additive is less than 40%, in case the weight average molecular weight of hydrophobic group is 1,500 or less, the additive was not sufficiently attached to the surface of the granular fertilizer by weak mixing for 1 minute.

As explained above, in the present invention, tri-block copolymer having characteristic properties is attached to and coated on a granular fertilizer, thereby exhibiting excellent floating property decrease effect.

The invention claimed is:

1. A controlled-release type fertilizer comprising:
a granular fertilizer core;
a coating layer formed on the surface of the granular fertilizer core, the coating layer comprising an olefin-based resin; and
additives attached on the coating layer, the additives comprising an ethylene oxide-propylene oxide-ethylene oxide(EO-PO-EO) tri-block copolymer or a propylene oxide-ethylene oxide-propylene oxide(PO-EO-PO) tri-block copolymer,
wherein the ethylene oxide-propylene oxide-ethylene oxide (EO-PO-EO) or the propylene oxide-ethylene oxide-propylene oxide (PO-EO-PO) tri-block copolymer has a HLB value of 1 to 10, and
the ethylene oxide block in the tri-block copolymer is included in an amount of 5 to 50 wt % based on the total weight of the tri-block copolymer.

2. The controlled-release type fertilizer according to claim 1, wherein the olefin-based resin is polyolefin or a copolymer of olefin and ethylene vinyl acetate.

3. The controlled-release type fertilizer according to claim 1, wherein the propylene oxide block in the tri-block copolymer has a weight average molecular weight of 950 to 4,000.

4. The controlled-release type fertilizer according to claim 1, wherein the ethylene oxide block in the tri-block copolymer has a weight average molecular weight of 50 to 2,000.

5. The controlled-release type fertilizer according to claim 1, comprising 0.025 wt % to 0.5 wt % of the additives based on the weight of the controlled-release type fertilizer.

6. The controlled-release type fertilizer according to claim 1, wherein the additives further comprise inorganic powder.

7. The controlled-release type fertilizer according to claim 6, wherein the inorganic powder has a specific surface area of 100 $m^2/g$ to 500 $m^2/g$.

8. The controlled-release type fertilizer according to claim 6, wherein the inorganic powder has a particle size of 1 μm to 500 μm.

9. The controlled-release type fertilizer according to claim 6, wherein the inorganic powder is hydrophilic inorganic powder having a hydroxyl group.

10. The controlled-release type fertilizer according to claim 6, wherein the inorganic powder is included in the amount of 0.01 wt % to 1 wt %, based on the weight of the controlled-release type fertilizer.

11. The controlled-release type fertilizer of claim 1, wherein the ethylene oxide-propylene oxide-ethylene oxide (EO-PO-EO) or propylene oxide-ethylene oxide-propylene oxide(PO-EO-PO) tri-block copolymer has a HLB value of 1 to 5, and wherein a weight average molecular weight of the propylene oxide block is 1500 to 4000.

12. The controlled-release type fertilizer of claim 1, wherein the coating layer is a shell covering the granular fertilizer core and the additives are uniformly attached to the surface of the shell.

13. A method for preparing a controlled-release type fertilizer, comprising the steps of:
i) coating the surface of a granular fertilizer core with a coating composition comprising an olefin-based resin to form a first coating layer; and
ii) coating the first coating layer with liquid additives comprising an ethylene oxide-propylene oxide-ethylene oxide(EO-PO-EO) tri-block copolymer or a propylene oxide-ethylene oxide-propylene oxide(PO-EO-PO) tri-block copolymer,
wherein the ethylene oxide-propylene oxide-ethylene oxide (EO-PO-EO) or the propylene oxide-ethylene oxide-propylene oxide (PO-EO-PO) tri-block copolymer has a HLB value of 1 to 10, and
the ethylene oxide block in the tri-block copolymer is included in an amount of 5 to 50 wt % based on the total weight of the tri-block copolymer.

14. The method of claim 13, wherein the coating step (ii) comprises adding the liquid additives in an amount of 0.025 wt % to 0.5 wt % based on the weight of the controlled-release type fertilizer.

15. The method of claim 13, wherein the first coating layer in step (i) is a shell covering the granular fertilizer core.

* * * * *